Aug. 29, 1972    P. M. YAVORSKY ET AL    3,687,614
CONVERSION TO FORMATE IN ONE STAGE OF THIOSULFATE FORMED
IN REMOVAL OF SULFUR DIOXIDE FROM GASES WITH FORMATE
Filed March 29, 1971

INVENTORS.
P.M. YAVORSKY
E. GORIN

United States Patent Office 3,687,614
Patented Aug. 29, 1972

3,687,614
CONVERSION TO FORMATE IN ONE STAGE OF THIOSULFATE FORMED IN REMOVAL OF SULFUR DIOXIDE FROM GASES WITH FORMATE
Paul M. Yavorsky, Monongahela, and Everett Gorin, Pittsburgh, Pa., assignors to Consolidation Coal Company, Pittsburgh, Pa.
Continuation-in-part of application Ser. No. 879,224, Nov. 24, 1969, now Patent No. 3,584,042, which is a continuation-in-part of application Ser. No. 667,479, Sept. 13, 1967. This application Mar. 29, 1971, Ser. No. 128,750
Int. Cl. B01d *53/34;* C01b *17/64;* C01c *53/06*
U.S. Cl. 423—243
5 Claims

ABSTRACT OF THE DISCLOSURE

Sodium, potassium, or ammonium thiosulfate is converted in one stage to the corresponding formate and $H_2S$ by heating the thiosulfate to an elevated temperature above 475° F. in the presence of carbon monoxide, steam, and one of the following: sodium, potassium, and ammonium formates.

CROSS-REFERENCES TO RELATED APPLICATIONS

This application is a continuation-in-part of application, Ser. No. 879,224, filed Nov. 24, 1969, now Pat. No. 3,584,042 which, in turn, was a continuation-in-part of application Ser. No. 667,479, filed Sept. 13, 1967 (now abandoned). Another related application is application Ser. No. 47,040, filed June 17, 1970 by N. J. Mazzocco, E. Gorin and P. M. Yavorsky, now Pat. No. 3,592,850.

BACKGROUND OF THE INVENTION (1) Field of the invention

The present invention relates to the regeneration of spent absorbent used in the removal of sulfur dioxide from gases containing sulfur dioxide, such as flue gases. The absorbent is sodium, potassium, or ammonium formate in the liquid state.

(2) Description of the prior art

In copending application, Ser. No. 879,224, cited above, there is described a two-stage process for regenerating spent absorbent used for removing $SO_2$ from flue gas. The absorbent, which is sodium, potassium, of ammonium formate in a liquid state, absorbs $SO_2$ by reacting with it essentially in accordance with the following Equation 1:

Equation 1—$2MOOCH + 2SO_2 = M_2S_2O_3 + 2CO_2 + H_2O$ where M is Na, K, or $NH_4$ The two-stage process of regeneration effects the reduction of $M_2S_2O_3$ to MCOOH and $H_2S$ in two successive reactions essentially in accordance with the following Equations 2 and 3:

Equation 2—$M_2S_2O_3 + 4MCOOH = 3M_2CO_3 + 2H_2S + CO_2$

Equation 3—$M_2CO_3 + 2CO + H_2O = 2MCOOH + CO_2$

The foregoing Equations 2 and 3 represent somewhat simplified expressions of what actually occurs. While they do represent the principal conversions, there are "side" reactions, namely:

Equation 4—$4MCOOH + M_2S_2O_3 = 4MHCO_3 + 2MSH$

Equation 5—$4MCOOH + M_2S_2O_3 = M_2CO_3 + 2M_2S + 3CO_2 + H_2O$

In copending application Ser. No. 47,040, cited above, there is dsecribed a three-stage process for regenerating the above-described spent formate absorbent which provides for the conversion of any by-product MSH and $M_2S$ (see Equations 4 and 5) as well as the conversion of the principal products. An additional stage is provided between the two reduction stages (see Equations 2 and 3). In this additional stage, $CO_2$ and $H_2O$ (steam) are passed through the product from the first reduction stage, to effect stripping of $H_2S$, and the two reactions expressed in the following Equations 6 and 7;

Equation 6—$MSH + CO_2 + H_2O = MHCO_3 + H_2S$

Equation 7—$M_2S + CO_2 + H_2O = M_2CO_3 + H_2S$

SUMMARY OF THE INVENTION

In accordance with the present invention, a process is provided for regenerating, *in one stage,* partially spent formate absorbent used to remove $SO_2$ from $SO_2$-containing gases. That process comprises passing a CO-containing gas (together with steam, if the absorbent contains no water or insufficient water) through the partially spent absorbent at a temperature above 475° F., preferably in the case of aqueous solutions, between 500° F. and 600° F. and at a pressure above 500 p.s.i., preferably between 750 p.s.i. and 1500 p.s.i. Higher temperatures are used if the absorbent is in a molten state; and the reducing gas also preferably contains hydrogen in such cases.

One of the keys to successful conduct of regeneration in one stage is the conversion of the by-product MSH (see Equation 4) to MOOCH and $H_2S$, as follows:

Equation 8—$MSH + CO + H_2O = MOOCH + H_2S$

This reaction is believed to be new.

The feasibility of single-stage (one-zone) regeneration as depicted by the reaction Equation 9—$K_2S_2O_3 + 6CO + 3H_2O \rightarrow 2KOOCH + 4CO_2 + 2H_2S$ was experimentally tested on synthetic spent aqueous potassium formate at a set of conditions known to be collectively suitable for all of the following reactions:

Equation 10—$4KOOCH + K_2S_2O_3 + H_2O = 4KHCO_3 + 2KSH$

Equation 11—$KHCO_3 + KSH = K_2CO_3 + H_2S$

Equation 12—$KSH + CO + H_2O = KOOCH + H_2S$

Equation 13—$K_2CO_3 + 2CO + H_2O = 2KOOCH + CO_2$

Carbon monoxide, in excess of that required by reaction of Equation 13 was supplied continuously to the thiosulfate-formate solutions: (1) to provide for the ultimate synthesis of formate from the reduction and stripping product, and (2) to act as a vehicle to remove $H_2S$ from the reactor. In one of the runs, $CO_2$ was also fed to assist the intermediate reaction of Equation 11 by, in effect, reducing the decomposition of bicarbonate to carbonate at the reaction temperature.

The results of the experimental demonstration of single-stage regeneration may be summarized as follows: All of the sequential reaction of Equations 10 to 13 inclusive, involved in regeneration of formate from thiosulfate, occurred simultaneously in a single-stage reactor at 536° F. with an inlet CO partial pressure of 580–700 p.s.i.a. For two hours residence time, the reduction of thiosulfate to sulfides was complete (99.7%), the stripping of $H_2S$ from the intermediate KSH was 87% complete and synthesis of formate proceeded to 73.5% of total regeneration of all potassium into the formate salt. The pressure of added $CO_2$ definitely assisted stripping, making $K_2CO_3$ available for final regeneration to formate by CO reduction. Complete sulfur recovery as $H_2S$ and complete regeneration of formate can likely be obtained by improved gas-liquid contacting in the single-stage reactor because the slower, overall rate controlling reactions are gas-liquid mass transfer controlled.

The apparatus used for the single-stage regeneration runs consisted of a magnetically stirred, one-liter, batch-loaded autoclave provided with the necessary temperature and pressure controls. The unit included facilities for continuous pressurized gas feed and monitored gas withdrawal, as well as a condenser for returning water back to the pool of liquid in the autoclave. Operationally, the gas flow and stirrer were shut off at the end of the reaction period and the reactor allowed to cool to room temperature. The autoclave was then depressurized, opened, and the product liquid analyzed.

All pertinent conditions and results appear in Table I. The major controlled difference between the two runs is that pure CO was fed in No. 1 run, whereas $CO_2$ and CO were fed in No. 2 run. The synthetic spent formate feed had 33 percent more formate than required for the stoichiometric reduction of the thiosulfate to assure the potential of complete reduction. Also, the solution fed to Run No. 2 contained more water to make sure that sufficient water was retained for consumption as per the reaction of Equation 13.

TABLE I

[Single-stage regeneration of KOOCH from $K_2S_2O_3$ with $H_2S$ recovery]

| | Run No. 1 | Run No. 2 |
|---|---|---|
| Conditions: | | |
| Temperature, ° F | 536 | 536 |
| Total pressure, p.s.i.g | 960 | 1,175 |
| Est. steam pressure, p.s.i.a | 260 | 400 |
| Feed gas at 410 s.c.f.h | (a) | (b) |
| Reaction time, hrs | 2.00 | 2.00 |
| Stirrer speed, r.p.m | 1,200 | 1,200 |
| Feed composition, gms: | | |
| $K_2S_2O_3$ | 96.00 | 96.00 |
| KOOCH [c] | 224.00 | 224.00 |
| $H_2O$ | 80.00 | 173.00 |
| Total charge weight | 400.00 | 493.00 |
| Product analysis, gms.: | | |
| KSH | 28.99 | 7.77 |
| $K_2S_2O_3$ | 1.01 | 0.27 |
| $K_2SO_3$ [d] | 1.14 | 0.89 |
| $K_2SO_4$ | 1.14 | 1.04 |
| $KHCO_3$ | 29.16 | 61.76 |
| $K_2CO_3$ | 46.43 | 15.36 |
| KOOCH [e] | 190.88 | 227.03 |
| $H_2O$ [f] | 59.65 | 129.88 |
| Actual product weight | 358.40 | 444.00 |
| $H_2S$-off | 21.86 | 28.93 |
| Product S distribution, percent S as— | | |
| $H_2S$ | 60.1 | 87.4 |
| KSH | 37.6 | 11.1 |
| $K_2S_2O_3$ | 1.0 | 0.3 |
| $K_2SO_3$ | 0.7 | 0.6 |
| $K_2SO_4$ | 0.6 | 0.6 |
| Sulfur balance (out/in) | 105.8 | 96.2 |
| Results (percent): | | |
| Reduction of $K_2S_2O_3$ | 99.0 | 99.7 |
| Regeneration of the reduction-consumed KOOCH | 80.3 | 101.8 |
| K in product as KOOCH | 61.8 | 73.5 | a 100% CO.
b 25% $CO_2$: 75% CO.
c 167.9 gm KOOCH = requirement for complete reduction of $K_2S_2O_3$.
d By difference, via S-balance.
e By difference, via K-balance.
f By difference, via Mass-balance.

DESCRIPTION OF DRAWING

For a better understanding of our invention, its objects and advantages, reference should be had to the accompanying drawing in which is shown a schematic flowsheet of the process of our invention.

Referring to the drawing, $SO_2$-containing gas is introduced into the bottom of a scrubber 10 through a conduit 12 while the selected formate (preferably concentrated aqueous potassium formate, e.g. 70–75%) is fed into the top of the scrubber through a conduit 14. The scrubber may be any conventional gas-liquid scrubbing tower designed to assure contact of the $SO_2$-containing gas at elevated temperatures with the selected formate in a liquid state. We prefer to use a jiggling bed of marbles through which the gas and liquid pass in countercurrent flow relationship. The temperature within the scrubber is preferably maintained between 170 and 200° F. when concentrated aqueous potassium formate is the absorbent. This temperature range has the advantage of eliminating the need for reheat of the scrubbed gases when they are released to the atmosphere. The scrubbed gas, freed of $SO_2$, or substantially so, is discharged through a stack 16 as clean stack gas.

The relative amounts of $SO_2$-containing gas and formate passing through the scrubber are regulated to provide for considerable excess of the formate, so that less than 25 percent by weight of the formate is converted to the thiosulfate. Accordingly the major constituents of the effluent liquid stream leaving the bottom of the scrubber through conduit 18 are aqueous potassium formate and potassium thiosulfate. These are circulated through a filter 20 by a pump 22 to the top of a stirred Formate Regenerator vessel 24 wherein the thiosulfate is reduced in a single stage to the formate by reaction with excess formate and with CO introduced through a conduit 26 into the bottom of the vessel 24. Additional water may be added through a conduit 27 if necessary. The temperature maintained in the regenerator is about 540° F., and the pressure held at about 1000 p.s.i.g. The residence time is about two hours. The gaseous product composed of $H_2S$ and $CO_2$ is discharged through a stack 28, while the regenerated aqueous formate is recycled to the scrubber through the conduit 14 after suitable adjustment of its concentration.

According to the provisions of the patent statutes, we have explained the principle, preferred construction, and mode of operation of our invention and have illustrated and described what we now consider to represent its best embodiment. However, we desire to have it understood that, within the scope of the appended claims, the invention may be practiced otherwise than as specifically illustrated and described.

We claim:

1. In a process including absorption and regeneration for removing sulfur dioxide from hot flue gas where, in the absorption, the sulfur dioxide-containing flue gas is scrubbed with a liquid absorbent consisting essentially of sodium, potassium, or ammonium formate to convert the formate to thiosulfate, and where, in the regeneration, the thiosulfate is converted to formate and $H_2S$, the improvement in the regeneration which comprises conducting the conversion of the thiosulfate to formate in a single stage by heating the partially spent absorbent to a temperature above 475° F. under a pressure above 500 p.s.i. while contacting the so-heated absorbent with carbon monoxide and steam.

2. The process according to claim 1 wherein the absorbent is an aqueous solution, and the regeneration temperature is between 500 and 600° F. and the pressure is between 750 and 1000 p.s.i.

3. The process according to claim 2 wherein the absorbent is aqueous potassium formate.

4. The process according to claim 2 wherein the absorbent is aqueous sodium formate.

5. The process according to claim 2 wherein the absorbent is aqueous ammonium formate.

References Cited

UNITED STATES PATENTS

| | | | |
|---|---|---|---|
| 1,036,705 | 8/1912 | Portheim | 23—116 |
| 1,166,160 | 12/1915 | Portheim | 23—116 |
| 2,010,615 | 8/1935 | Vanderbilt et al. | 23—116 |
| 2,031,802 | 2/1936 | Tyrer | 23—178 |
| 2,142,987 | 1/1939 | Bacon et al. | 23—178 |
| 3,411,875 | 1/1968 | Yoshikawa et al. | 23—116 |
| 3,576,598 | 4/1971 | Plentovich et al. | 23—116 |
| 3,584,042 | 6/1971 | Yavorsky et al. | 23—115 X |
| 3,592,850 | 7/1971 | Mazzocco et al. | 23—115 X |

OTHER REFERENCES

Goliath et al., "Mechanism of Reduction of Sulfur Dioxide by Formic Acid," Acta Chemica Scandinavica, vol. 16, No. 3, 1962, pp. 570–574.

EARL C. THOMAS, Primary Examiner

U.S. Cl. X.R.

23—1 D, 178 S; 260—542; 423—514